Figure 1:
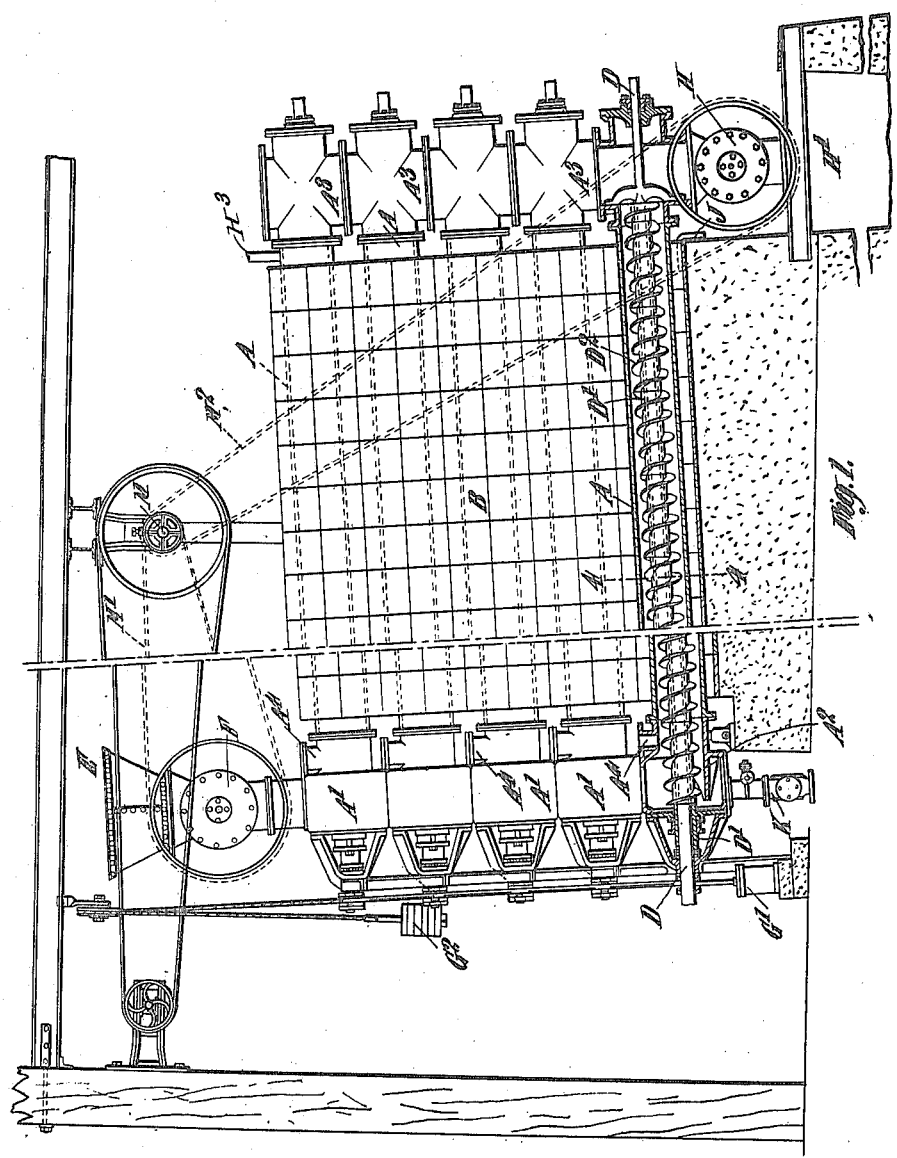

L. DEL MONTE Y ALDAMA.
SEPARATION OF VOLATILE PRODUCTS FROM SOLID CARBONACEOUS MATERIAL.
APPLICATION FILED SEPT. 21, 1914.

1,196,470.

Patented Aug. 29, 1916.
3 SHEETS—SHEET 1.

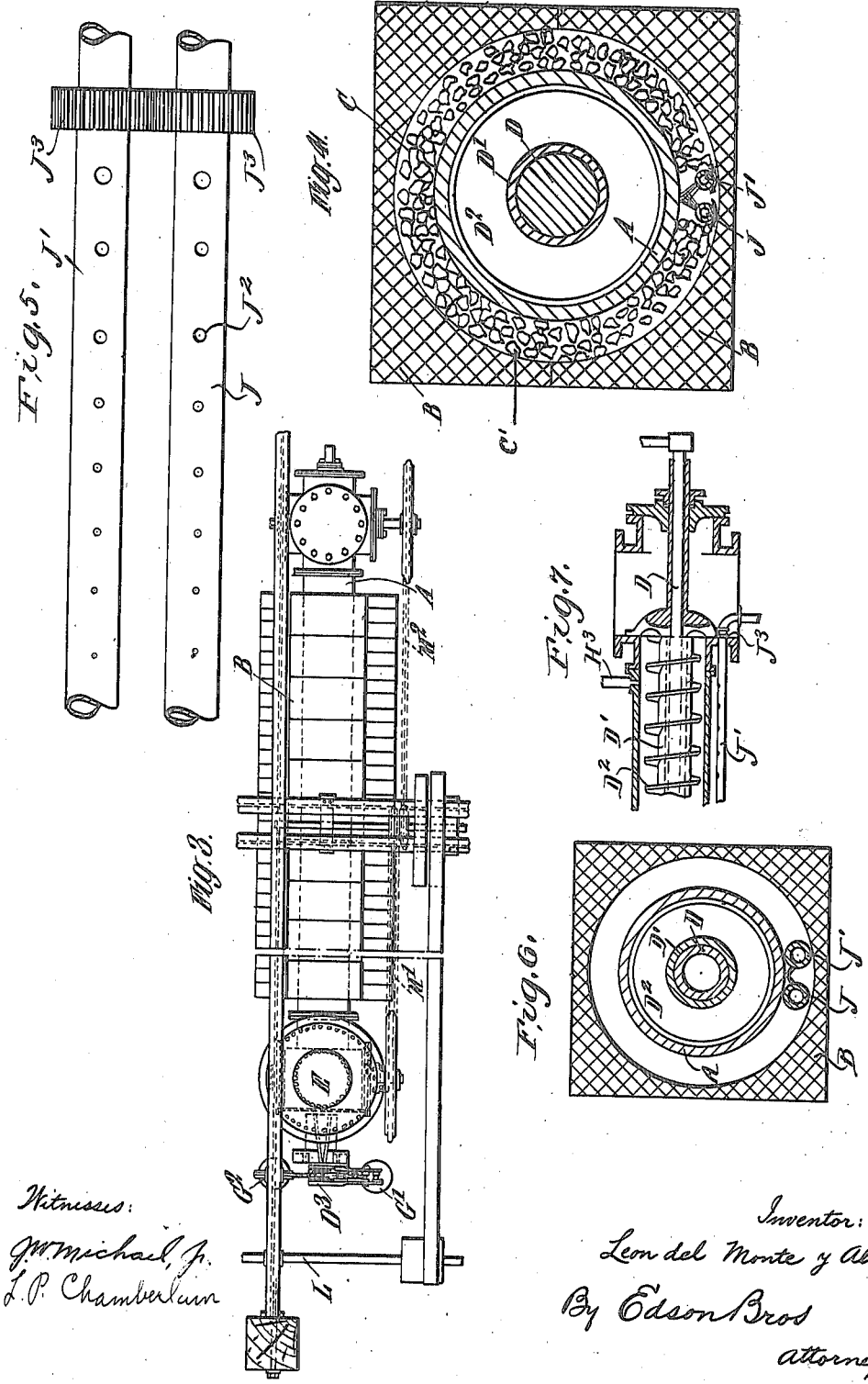

L. DEL MONTE Y ALDAMA.
SEPARATION OF VOLATILE PRODUCTS FROM SOLID CARBONACEOUS MATERIAL.
APPLICATION FILED SEPT. 21, 1914.

UNITED STATES PATENT OFFICE.

LEON DEL MONTE Y ALDAMA, OF ADELPHI, LONDON, ENGLAND, ASSIGNOR TO OIL & CARBON PRODUCTS LIMITED, OF ADELPHI, ENGLAND.

SEPARATION OF VOLATILE PRODUCTS FROM SOLID CARBONACEOUS MATERIAL.

1,196,470.  Specification of Letters Patent.  Patented Aug. 29, 1916.

Application filed September 21, 1914.  Serial No. 862,785.

*To all whom it may concern:*

Be it known that I, LEON DEL MONTE Y ALDAMA, a citizen of the United States of America, residing at Watergate House, Adelphi, in the county of London, England, have invented certain new and useful Improvements Relating to the Separation of Volatile Products from Solid Carbonaceous Material, of which the following is a specification.

This invention relates to the separation of volatile products from solid carbonaceous material such as coal, shale, peat and the like, by heating the same in a retort or similar chamber and conveying the evolved vapors to a cooler region. In prior systems of separation this cooler region has usually been constituted by separate condensing apparatus.

According to the present invention the retort itself forms the condensing chamber, the carbonaceous material fed continuously through the retort being heated to a progressively higher temperature as it passes from the inlet end while the vapors arising from the material at the different temperatures are, on their way to the gas or vapor outlet, caused to pass over relatively cooler portions of the material in its solid or partly vaporized condition, so that the cooler material itself condenses the portions of the vaporized material which are condensable at the lower temperatures to which they are so subjected, the condensed volatile material being then removed from the retort in liquid form without again coming into contact with the more highly heated material, and so regulating the temperatures and directing and controlling the withdrawal of the condensable volatile products that the different grades of volatile matter in all portions of the material are vaporized at their respective temperatures and thereupon conveyed into contact with relatively cooler portions of the material in its solid or partly vaporized condition, whereby condensed volatile matter is obtained in and can be removed from the retort in liquid form.

In carrying out the process the different temperatures are preferably graduated uniformly from point to point along the retort and in order to operate continuously the material under treatment is made to travel slowly through the different regions of the retort from the cold lower end to the hot higher end thereof. Moreover, in order to assist in the travel of the evolved vapors toward cooler regions, the known expedient of a gaseous traveling medium is advantageously used, but any known equivalent may be employed. Finally in order to insure that the condensed vapors in any one region of the retort will not return into a hotter region, where they would undergo revaporization and possibly decomposition or "cracking", the retort is inclined with its cold end lowermost as above stated, so that the liquids resulting from condensation of hot vapors with relatively cooler material under treatment in the different regions of the retort flow or trickle toward the cold lower end. Under such conditions the volatile products evolved in any region of the retort and conveyed by the gaseous medium toward the lower end are to a large extent condensed by coming in contact with the relatively cool incoming material traveling in the opposite direction and then continue to travel in liquid form down the retort, from the relatively cooler lower end of which they are removed still in liquid form, instead of being conveyed in vapor form out of the retort and condensed separately. It will be understood that when the volatile products corresponding to any particular temperature are vaporized they are immediately carried off by the gaseous medium into a region or into successive regions of lower temperature where they come into contact with the relatively cool material under treatment in the said region or regions and are thereby for the most part condensed, the result being that there is no possibility of the vapors becoming decomposed or converted into less readily condensable vapors or gases. The temperature at the hottest part of the retort need not be more than about 600° C., but even if the hottest part is above this temperature there is no decomposition or "cracking" of the vapors.

The above described heating effect takes place with each of the several grades of volatile matter so that none of the several grades is over-heated but all are immediately taken up at their respective vaporizing temperatures by the gaseous medium and conveyed to a region or regions where condensation begins to take place promptly.

The conveying of the material through the retort, which is preferably cylindrical in shape and is slightly inclined upward toward the hot end, as hereinbefore stated, may be effected in any convenient way, but is most conveniently effected by the well known expedient consisting of a helical blade on a rotary shaft. The uniformly graduated temperature of the material is conveniently maintained externally of the retort by providing an annular space around each retort and arranging one or more axial rows of gas and air jets of graduated size in the said space.

The gaseous medium, which may be the washed and purified uncondensable gaseous product from the retort, is introduced in a cold condition and therefore serves to cool the coke or similar vapor-freed material as it passes out of the retort. Consequently, the cooling or quenching of the coke after its exit from the retort is rendered unnecessary and the heat otherwise lost is usefully employed in heating the gaseous medium. The gaseous medium is made to travel through the retort at a comparatively slow speed and therefore assumes the successively lower temperatures of the successive regions through which it passes. It will of course be understood that the condensed volatile matter is removed from the retort in liquid form in any convenient manner. It may also be pointed out that since the material under treatment travels into regions of progressively higher temperature instead of entering immediately into a region of maximum temperature the volatile constituents of the material are gradually "sweated out" and cannot be overheated or "cracked" because as soon as they arrive at the region corresponding to their vaporizing temperature they are immediately taken up by the gaseous medium and conveyed to a cooler region into contact with relatively cool material, whereby their condensation is for the most part effected. Moreover, even if the hot end of the retort is raised to a temperature considerably exceeding the vaporizing temperature of the least easily volatilized constituent no overheating of the vapor takes place because all the grades of vapor are carried off by the gaseous medium at the regions corresponding to their respective vaporizing temperatures in the hotter regions beyond the region at which the least easily volatilized constituent is carried off, the coke or other vapor-freed material is merely heated further but yields no more volatile constituents condensable at approximately atmospheric temperatures since all of the latter have already been removed at their respective vaporizing temperatures in cooler regions within the retort as above stated.

The cooling of the coke or other vapor-freed material just prior to its exit from the hot end of the retort is facilitated, and the yield of condensed volatile products and also the yield of by-products from the uncondensed gases and vapors passing out of the retort are increased, by admitting water into the retort near the hottest part thereof.

In the accompanying drawings, one constructional form of apparatus for carrying the invention into effect is illustrated by way of example.

Figure 2:
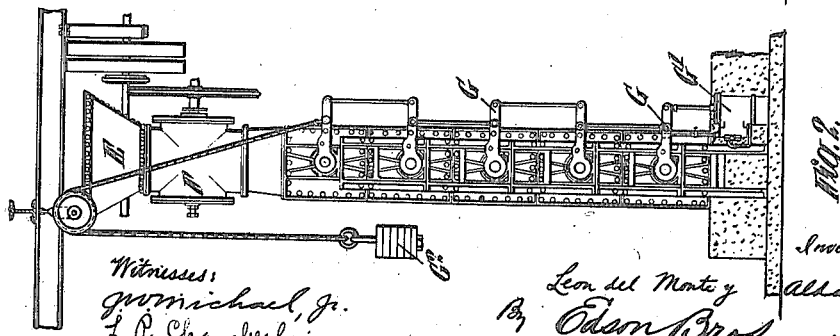
Figure 8:
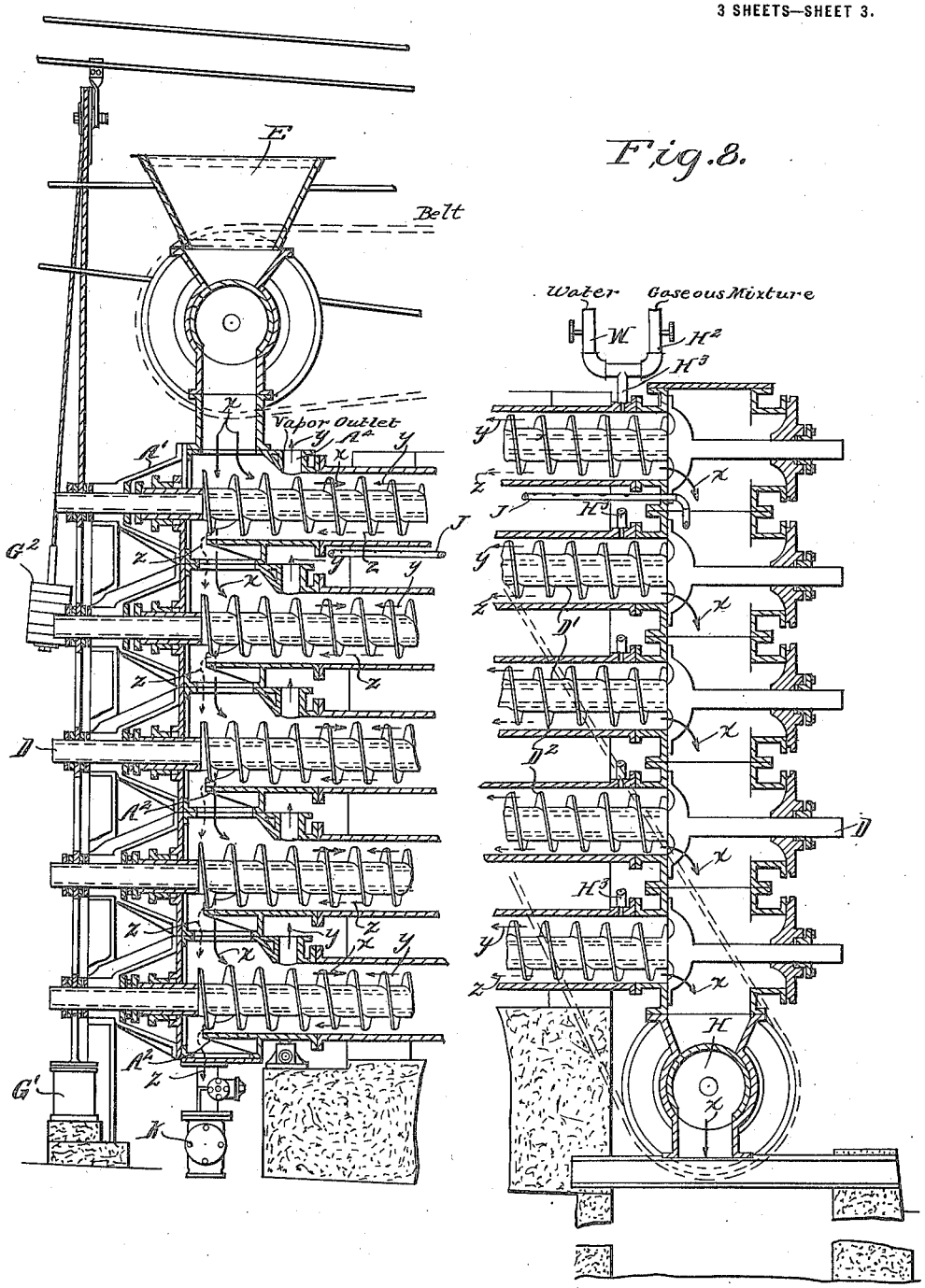

Figure 1 is a side elevation of a set of five retorts and their accessories and inclosing brickwork, the lowermost retort being shown in section. Fig. 2 is an end elevation and Fig. 3 a plan corresponding to Fig. 1. Fig. 4 is an enlarged section on the line 4—4 of Fig. 1. Fig. 5 is a detail view disclosing the nozzle pipes which are adapted to be placed exterior of a retort. Fig. 6 is a sectional view through a retort within the shaft which mounts the feed screws as a hollow member. Fig. 7 is a detail view, partly in section, disclosing the mechanism of Fig. 6, for heating the material. Fig. 8 is a vertical sectional view disclosing diagrammatically by arrows the passage of fuel in one direction, and the passage of vapors and gaseous mixture in the opposite direction.

The cylindrical retorts A are arranged one above the other and are each inclosed in fireclay slabs B shaped to provide an annular space C, which may be filled with loose broken brick or fireclay C'. Through each retort extends a shaft D to which is secured a sleeve D' formed with a helical blade $D^2$. The sleeve and blade are made in sections of convenient length and are assembled upon the shaft D, to which they are removably secured so as to rotate therewith. The retorts are slightly inclined to the horizontal and their lower ends are secured to inlet boxes A' into which the material to be treated falls from a hopper E by way of a rotary valve F. The helical blades $D^2$ extend into the inlet boxes A' and their shafts D project through the boxes and are provided with ratchet wheels $D^3$ for engagement with pawls mounted on rocking arms G operated in one direction by a hydraulic ram G' and in the other direction by the unbalanced portion of the combined weights of the arms G, which are partially balanced by a weight $G^2$. Each of the boxes contains a part-cylindrical scoop $A^2$ situated beneath the adjacent part of the corresponding helical blade $D^2$, without however entirely obstructing the vertical passage through the box, so that the material escaping over and around the blade and scoop in one box descends into the box below it. The upper end of each retort is secured to an outlet box $A^3$, into which the spent or vapor-freed material is thrust by the blades $D^2$ whereupon it falls and is delivered through a rotary valve H to a truck in a sunk track or passageway H'.

In the lowermost part of the space C around each retort A extend longitudinally two pipes J, J', one for air and the other for gas. Similar pipes J, J' are provided within the hollow conveyer shaft D as shown more clearly in Fig. 4. These pipes as illustrated at Fig. 5, are radially perforated at intervals in their length, as at J², and are angularly adjustable to enable the gas and air jets to be directed at any desired angle against one another, by any suitable means indicated at J³. The holes are graduated in size, the largest being at the gas inlet end. W is a pipe for admitting water into the retort near the hottest end thereof. In Fig. 8, one set of the pipes J are shown, but it is to be understood that the other retorts are provided with similar means to heat them. The gaseous medium is introduced in a cold condition and at a pressure of about four pounds to the square inch from a pipe H² into the top H³ of the exit valve H.

Referring more particularly to Fig. 8, three sets of arrows are indicated, wherein the thick arrows $x$ show the path of the solid fuel which falls from the rotary valve below the hopper into the ends of the retort tubes, the fuel which is not taken up by one tube dropping over the end into the second, and so on down to the bottom tube; the solid fuel or coke remaining after distillation passing out at the outlet end of the retort tubes and falling down the open column, as indicated by the arrows, into the outlet, where a second rotary valve H is situated. The vapors arising in the retort tubes are indicated by the thin arrows $y$ pointing in the opposite direction to the arrows $x$, the uncondensed vapors escaping from each tube through the outlet which is shown in section. Along the lower side of the tubes the condensed liquid flows in the direction shown by the dotted arrows $z$, flowing finally over the scoop-shaped end A² of each tube and dropping down to the liquid outlet K, below.

From the foregoing description it will be understood that the material to be treated enters the retorts A at atmospheric temperature through the inlet boxes A' and is slowly conveyed by the blades D² through the retorts from left to right, while the cold gaseous medium enters the retorts adjacent to the boxes A³ and travels from right to left. The material under treatment encounters regions of progressively increasing temperature, and the gaseous medium conveys the vapors evolved at any region into regions of lower temperature as already described the result being that the spent or vapor-freed material passes out of the retorts on the right hand through the valve H comparatively cold, while the condensation of the evolved vapors occurs at or near the left hand end of the retorts by contact with the cold incoming material. The condensed vapors trickle or flow down the retorts and through the inlet boxes A' and are withdrawn below the lowermost box by way of the receptacle K. The liquid may then be subjected to fractional distillation in the ordinary way. The gaseous medium and the uncondensable vapors pass out of the retorts through exits A⁴, and are afterward washed and purified in a similar manner to that adopted with the retort gases of ordinary coal gas manufacture. The quantity and character of the uncondensed vapors passing through the exits A⁴ are naturally dependent in part upon the temperature at which the lower end of the retort is maintained.

It will be understood that the whole plant can be made more or less automatic. Mechanical power is transmitted from a shaft L to a counter-shaft M and thence by sprocket wheels and chains M' and M² to the rotary valves F and H respectively.

What I claim and desire to secure by Letters Patent of the United States is:—

1. The process for separating condensable volatile products from solid carbonaceous material distilled in a retort, which consists in heating the material to a graduated temperature, leading the distilled vapors that arise from the material at any one of the number of regions differing in temperature into contact with relatively cooler portions of the material in its solid or partly vaporized state in the retort, and removing the liquefied volatile matter condensed by the said cooler portions of the material without permitting it to return to hotter regions of the retort.

2. The process for separating condensable volatile products from solid carbonaceous material distilled in an inclined retort, which consists in heating the material to a graduated temperature, leading the exudates that are educed and the distilled vapors that arise from the material at any one of a number of regions differing in temperature into contact with relatively cooler portions of the material in its solid or partly vaporized state in the retort and removing the liquefied volatile matter condensed by the said cooler portions of the material without permitting it to return to the hotter regions of the retort.

3. The process for separating condensable volatile products from solid carbonaceous material distilled in an inclined retort, which consists in feeding the material through the retort from the lower end, heating it to an increasing temperature as it rises, leading the distilled vapors that arise from the material at any one of a number of regions differing in temperature into contact with relatively cooler portions of the material in the retort and removing the liquefied volatile matter condensed by the said cooler portions of the material without permitting it to return to hotter regions of the retort.

4. The process for separating condensable volatile products from solid carbonaceous material distilled in an inclined retort, which consists in feeding the material through the retort from the lower end, heating it under non-oxidizing conditions to an increasing temperature as it rises, leading the distilled vapors that arise from the material at any one of a number of regions differing in temperature into contact with relatively cooler portions of the material in the retort and removing the liquefied volatile matter condensed by the said cooler portions of the material without permitting it to return to hotter regions of the retort.

5. The process for separating condensable volatile products from solid carbonaceous material distilled in an inclined retort, which consists in heating the material to a progressively increasing temperature toward the higher end of the retort, leading the distilled vapors that arise from the material toward the lower end of the retort and into contact with progressively cooler material and removing from the lower end of the retort the liquefied volatile matter condensed by the said cooler material and flowing down the inclined retort.

In testimony whereof I affix my signature in presence of two witnesses.

LEON DEL MONTE Y ALDAMA.

Witnesses:
PAUL PILLION,
FRANK COULTHAIT.